United States Patent
Choquette et al.

(10) Patent No.: US 6,594,753 B2
(45) Date of Patent: *Jul. 15, 2003

(54) METHOD AND APPARATUS FOR DUAL ISSUE OF PROGRAM INSTRUCTIONS TO SYMMETRIC MULTIFUNCTIONAL EXECUTION UNITS

(75) Inventors: Jack Choquette, Los Altos, CA (US); Norman K. Yeung, Fremont, CA (US)

(73) Assignee: SandCraft, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/519,524

(22) Filed: Mar. 6, 2000

(65) Prior Publication Data

US 2002/0199084 A1 Dec. 26, 2002

Related U.S. Application Data

(63) Continuation of application No. 08/883,147, filed on Jun. 27, 1997, now Pat. No. 6,035,388.

(51) Int. Cl.$^7$ .............................................. G06F 9/30
(52) U.S. Cl. ........................................ 712/214; 712/216
(58) Field of Search .............................. 712/23, 35, 205, 712/206, 214, 215, 32, 216

(56) References Cited

U.S. PATENT DOCUMENTS

| | | | | |
|---|---|---|---|---|
| 3,943,494 A | * | 3/1976 | Holmes, Jr. et al. | 712/226 |
| 4,442,484 A | | 4/1984 | Childs, Jr. et al. | 364/200 |
| 5,450,607 A | | 9/1995 | Kowalczyk et al. | 395/800 |
| 5,467,476 A | | 11/1995 | Kawasaki | 395/800 |
| 5,530,816 A | | 6/1996 | Holt | 712/217 |
| 5,546,597 A | | 8/1996 | Martell | 395/800 |
| 5,559,976 A | | 9/1996 | Song | 395/375 |
| 5,564,056 A | | 10/1996 | Fetterman et al. | 395/800 |
| 5,574,928 A | | 11/1996 | White | 395/800 |
| 5,574,942 A | | 11/1996 | Colwell | 395/800 |
| 5,613,080 A | | 3/1997 | Ray et al. | 712/214 |
| 5,628,021 A | | 5/1997 | Iadonato | 385/800 |
| 5,664,136 A | | 9/1997 | Witt | 395/384 |
| 5,671,382 A | | 9/1997 | Shintani et al. | 712/215 |
| 5,689,720 A | | 11/1997 | Nguyen | 385/800 |
| 5,742,791 A | * | 4/1998 | Mahalingaiah | 711/146 |
| 5,790,827 A | | 8/1998 | Leung | 395/392 |
| 5,898,849 A | * | 4/1999 | Tran | 711/121 |
| 5,922,068 A | | 7/1999 | Shinatni et al. | 712/215 |
| 5,974,522 A | * | 10/1999 | Torng et al. | 710/267 |
| 6,035,388 A | * | 3/2000 | Choquette et al. | 712/215 |

OTHER PUBLICATIONS

Meriam–Webster, "Meriam–Webster's Collegiate dictionary", 1997, Meriam–Webster, Inc., 10$^{th}$ ed., pp. 544, and 1144.*

Bauman et al, UltraSparc: The Next Generation Superscalar 64–Bit Sparc, IEEE Computer Society Press, pp. 1–10.

Blanck et al, The Super Sparc Microprocessor, IEEE Computer Society Press, pp. 1–6.

* cited by examiner

Primary Examiner—John F. Niebling
Assistant Examiner—Stacy A Whitmore
(74) Attorney, Agent, or Firm—Blakely, Sokoloff, Taylor & Zafman LLP

(57) ABSTRACT

A microprocessor capable of processing at least two program instructions at the same time and capable of issuing the two program instructions to two symmetrical multifunctional program execution units. The microprocessor includes a plurality of registers which store a plurality of operands and an instruction issue control which controls issuance of program instructions to the two symmetrical multifunctional program execution units. The instruction issue control issues the two program instructions (e.g. first and second) without decoding them in order to determine the processing functions required to be performed in response to the two program instructions.

37 Claims, 6 Drawing Sheets

A: 2 INSTRUCTIONS
B: FROM ISSUE CTL
  • INSTRUCTION
  TO ISSUE CTL
  • UNIT IS BUSY
C: DATA BYPASS MUX SELECT
D: READ/WRITE REGISTER FILE ADDRESS
E: REGISTER DATA
F: INSTRUCTION RESULT

METHOD AND APPARATUS FOR DUAL ISSUE OF PROGRAM INSTRUCTIONS TO SYMMETRIC MULTIFUNCTIONAL EXECUTION UNITS

This is a continuation of application Ser. No. 08/883,147, filed on Jun. 27, 1997, now U.S. Pat. No. 6,035,388.

BACKGROUND OF THE INVENTION

The present invention relates generally to the field of microprocessors which are capable of processing at least two program instructions at the same time.

Modern microprocessors, including superscalar microprocessors, have improved performance due to the capability of processing at least two program instructions at the same time. This capability arises from having a first group of execution units which can receive a program instruction for execution, and a second group of execution units which can receive a second program instruction for execution.

FIG. 1 shows a typical microprocessor of the prior art which uses a dual issue mechanism wherein two program instructions may be issued to two groups of execution units. The register file 30 and the issue control and bypass control unit 12 support the issuance of two instructions, one instruction going to the execution units 14, 16, and 18 (issue left) and another instruction going to the execution units 20, 22, and 24 (issue right). Within each group of execution units, there are three specialized functional units. In particular, the execution units on the issue left side include a floating point division execution unit 14, a floating point multiplier execution unit 16, and an ALU execution unit 18. In the group of execution units on the issue right side, there is a floating point adder execution unit 20, an ALU execution unit 22, and an integer multiplier unit 24. Each of these execution units is coupled to the issue control and bypass control unit 12 by a bi-directional link which provides instructions from the issue control unit 12 to the particular execution unit and which provides a signal indicating the execution unit is busy to the issue control and bypass control unit 12. In this manner, the issue control and bypass control unit 12 can determine the status of each execution unit (e.g. is the particular execution unit busy executing an instruction previously provided?) and can provide instructions for execution if the particular execution unit is not busy. These links are shown as 31A–31F in FIG. 1. The issue control and bypass unit 12 is coupled to an instruction cache 10 through a bus 11. It will be appreciated that the issue control unit 12 provides read commands to the instruction cache 10 to cause the instruction cache 10 to deliver one or two instructions at a time to the issue control unit 12.

Each execution unit within a group of execution units is coupled to an output of a multiplexer in order to receive operands which are processed according to the instruction being executed in the particular execution unit. These operands are received from either the register file 30 or from a bypass pathway in which an output from a prior executed instruction is used as an operand for a current instruction. The multiplexer 26 receives an output 30b from the register file and also receives an output from each of the six execution units and provides a selected output to the three execution units 14, 16, and 18 in the issue left group of execution units. The multiplexer 28 receives an output 30a from the register file 30 and also receives outputs from each of the six execution units, and provides an output which is selected by the control select line 15. This output is provided to the three execution units 20, 22, and 24 in the issue right execution group. The six outputs 32a, 32b, 32c, 32d, 32e, and 32f from the six execution units 14, 16, 18, 20, 22, and 24 are provided to both multiplexers 26 and 28 and also provided to the register file 30 as inputs to the register file 30. It will be appreciated that the register file 30 may be configured to provide dual port reads such that operand outputs 30a and 30b can be provided based upon the addresses provided over address bus 17 from the control unit 12. Moreover, the register file 30 may support multiple writes, such as six multiple write ports from the six outputs. It will also be appreciated that in typical operation of the microprocessor shown in FIG. 1, only two of the write ports will be active at once since normally only one result of a computation is provided from the issue left side and only one execution result is provided from the issue right side.

The operation of the microprocessor shown in FIG. 1 will now be described. The issue control unit 12 receives two instructions from the instruction cache 10. The issue control unit 12 then decodes each instruction to determine the resources or functions to be performed as required by the particular instruction. For example, if an instruction requires floating point division or floating point multiplication, then this instruction must be steered into the issue left group of execution units. Similarly, if a decoded instruction reveals that a floating point addition or integer multiplication is required by the instruction, then it must be issued to the issue right group of execution units. Thus, decoding in the issue control and bypass control unit 12 is required in order to determine whether an instruction goes to issue left or to issue right.

The issue control and bypass control unit 12 must also perform the resolution of execution unit conflicts before issuing an instruction. The following table shows an example of the stall logic in the issue control unit 12 in order to resolve execution unit conflicts. If there is an execution unit conflict indicated by a "X", then the issue control will stall the issue of the instruction.

TABLE A

| Issue Instruction Type | Instruction in Unit: | | | | | |
|---|---|---|---|---|---|---|
| | FP Div | FP Mult | FP Add | ALU 0 | ALU 1 | Int Mult |
| FP Div | X | | | | | |
| FP Mult | | X | | | | |
| FP Add | | | X | | | |
| ALU 1 | | | | X | X | |
| Int Mult | | | | | | X |

For example, if the issue instruction is of the type "FP Div" (i.e., the instruction is for a floating point division), the instruction will stall if there is an instruction in the floating point division unit 14 which is currently being executed by the floating point execution unit 14.

The issue control and bypass unit 12 also stalls the issuance of instructions in order to resolve register conflicts.

TABLE B

| Issue Instruction Registers | Instruction in Unit: | | | | | |
|---|---|---|---|---|---|---|
| | FP Div | FP Mult | FP Add | ALU 0 | ALU 1 | Int Mult |
| Operand 1 | X | X | X | X | X | X |
| Operand 2 | X | X | X | X | X | X |
| Destination | X | X | X | X | X | X |

If there is a register match between any of the registers indicated by "X", then the issue control unit 12 will stall the issue on the instruction. For example, if for a particular instruction which is yet to be issued, if the first operand for the instruction is to be stored in the same register as the destination register for a floating point division operation which is currently being executed, then the yet to be issued instruction will be stalled.

The issue control unit 12 also resolves resource conflicts at the register file 30 which arise because different instructions have different processor cycle times. This is shown by way of example in Table C below.

TABLE C

| Cycle | ALU0 | ALU1 | FP Mult | FP Add |
| --- | --- | --- | --- | --- |
| 1 | — | — | Issue | — |
| 2 | — | — | Execute | Issue |
| 3 | — | — | Execute | Execute |
| 4 | Issue | Issue | Execute | Execute |
| 5 | Write Result | Write Result | Write Result | Write Result |

As can be seen from Table C, in Cycle 5 there are four results that are produced. Unless there are four write ports into the register file which contains a plurality of registers, the issue of instructions for the ALU0 and ALU1 in Cycle 4 may need to be stalled.

As can be seen from the foregoing description, the issue control unit must perform a variety of control operations in order to resolve various conflicts and yet attempt to issue two program instructions substantially concurrently if possible. It will be appreciated that such control, such as the decoding of program instructions in order to steer the instruction into the appropriate group of execution units, requires considerable circuitry and also requires considerable time in designing such a control unit for this type of microprocessor.

In many circumstances, it will be desirable to provide a microprocessor which requires less complicated issue control.

SUMMARY OF THE INVENTION

A microprocessor which is capable of processing at least two program instructions at the same time and which is capable of issuing the two program instructions to two symmetrical multifunctional program execution units is described.

In a typical embodiment, the microprocessor is a superscalar microprocessor which includes a plurality of registers which store a plurality of operands and further includes an instruction issue control unit which controls the issuance of program instructions to the two symmetrical multifunctional program execution units. The instruction issue control issues the two program instructions, such as a first and second program instruction, without decoding the instructions in order to determine the processing functions required to be performed in response to the two program instructions.

The symmetrical multifunctional program execution units each consist of a set of independent processing logic circuits which are capable of performing a first set of functions. Typically, the independent processing logic circuits in each of the symmetrical multifunctional program execution units are identical to the extent of the functionality required in response to execution of program instructions issued by the issue control logic.

An example of a method according to the present invention issues two program instructions substantially concurrently to two multifunctional digital logic processing units. It will be appreciated that this method is capable of issuing these two program instructions substantially concurrently although it need not do so in every instance depending on stalls asserted in response to resource conflicts. The issue control logic is capable of substantially concurrently issuing two program instructions to the two multifunctional digital logic processing units and it can do so without first decoding a first and a second program instruction in order to determine the logical function required to be performed in response to the first and second program instructions.

DETAILED DESCRIPTION

The present invention relates to a microprocessor, which is typically implemented on a single semiconductor integrated circuit and which is capable of supporting concurrent processing of at least two program instructions through at least two "pipelines." The present invention will be described by using various examples which are shown in the accompanying figures and described below. It will be appreciated that various alternative implementations may be utilized in accordance with the present invention.

Figure 1:
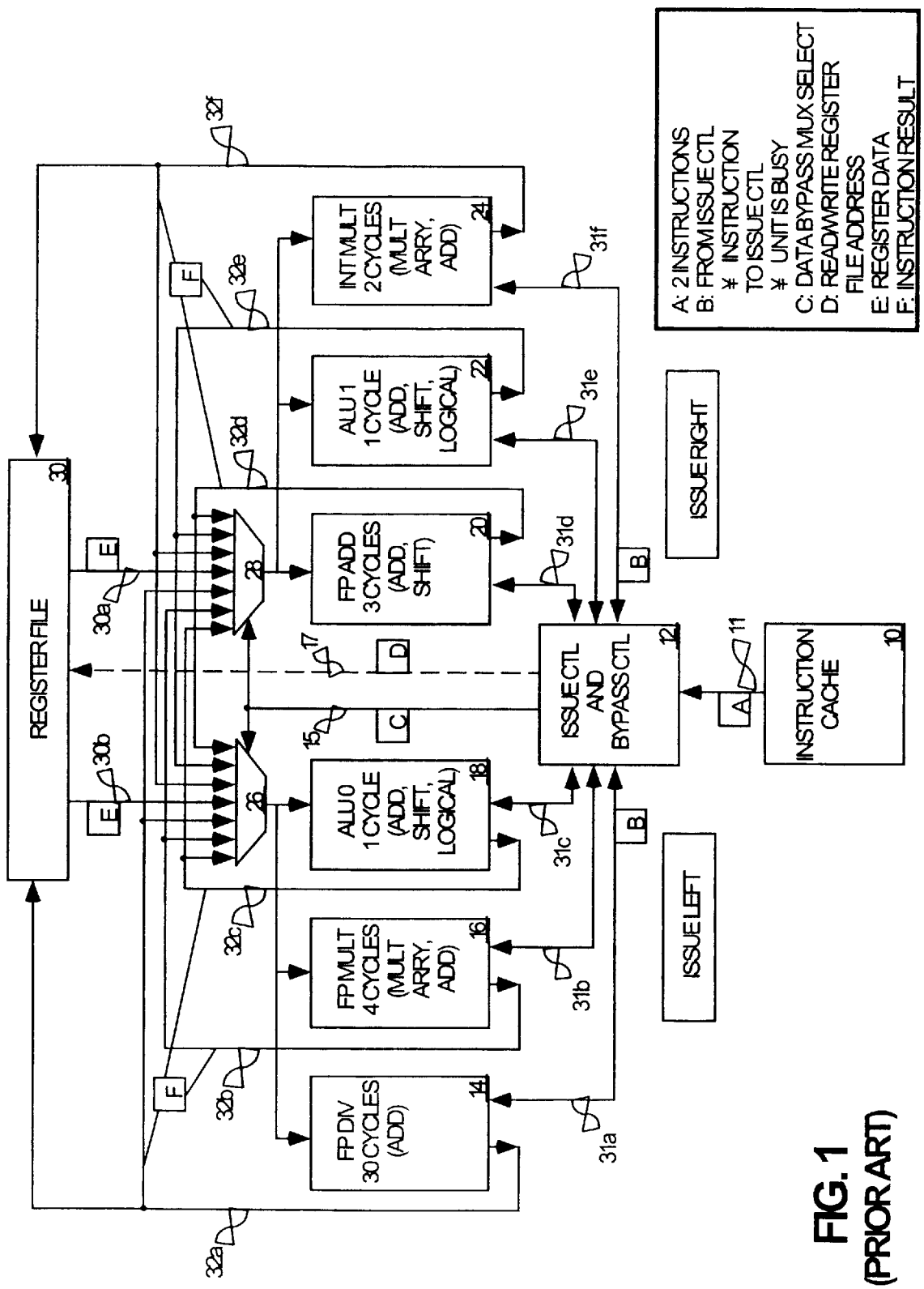
FIG. 1 shows a prior art implementation for a microprocessor which supports dual issue of program instructions to two groups of execution units.
Figure 2:
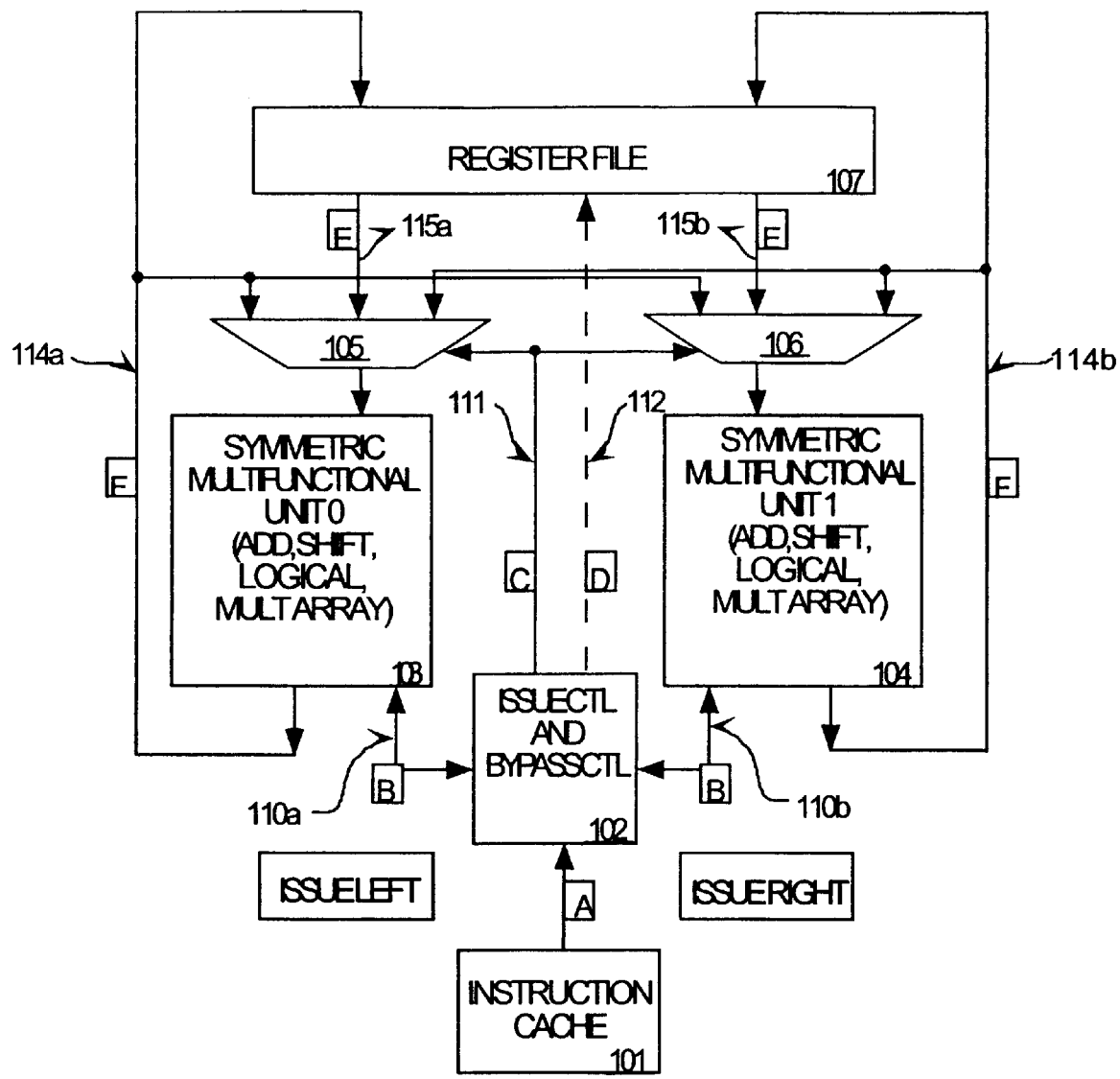
FIG. 2 illustrates an example of one embodiment of a microprocessor according to the present invention.

FIG. 2 shows an example of a microprocessor which executes program instructions and which supports concurrent processing of at least two program instructions. Typically, the microprocessor shown in FIG. 2 will be formed in a monocrystalline silicon semiconductor integrated circuit, although other implementations will be appreciated by those skilled in the art. The microprocessor will include, at least in certain embodiments, numerous well-known supporting circuitry, such as clock generating circuitry, input and output buffer circuitry, data and address buses, and other well-known supporting components. FIG. 2 illustrates the core of a microprocessor according to the present invention. This includes an instruction cache 101 which is coupled by a bus to an issue control and bypass control unit 102. In turn, the issue control and bypass control 102 unit is coupled to two symmetrical multifunctional units 103 and 104. It will be appreciated that the symmetric multifunctional unit 103 may support a plurality of different processing functions, such as addition, division, logical operations, and multiplications. The particular group of functions supported will depend on the particular implementation. The multifunctional execution unit 104 also represents a group of execution units providing a plurality of processing functions. The processing functions provided by the unit 104 will match the processing functions provided by the unit 103 such that each unit 103 and 104 is capable of performing instructions issued by the issue control and bypass control unit 102. Operand inputs for the multifunctional processing unit 103 is provided by the multiplexer 105, and operands for the multifunctional processing unit 104 is provided by the multiplexer 106. These operands are received from either the register file 107 or from the output of a prior executed instruction from either unit 103 or unit 104.

The register file 107 includes a plurality of registers each having a specific address or number identifying the register. Data may be stored into the registers from the outputs 114a and 114b from the two groups of multifunctional execution units 103 and 104. Moreover, data may be stored into the various registers of the register file 107 through a data and address bus (not shown) which is coupled to the register file 107 to provide data to and from the register file 107. As shown in FIG. 2, the register file 107 includes two write ports and two read ports such that it is fully dual ported. Alternatively, the register file 107 may include an additional read and write port for providing data to and from a data bus on the microprocessor. The read ports 115a and 115b provide operand data to the multiplexers 105 and 106 respectively. Normally, if a bypass is not required, the operands from the read ports 115a and 115b are selected under control of selection line 111 to be outputted at the output of the multiplexers 105 and 106. These outputs are provided as operand inputs to the multifunctional execution units 103 and 104 respectively. The addresses for retrieving the various operands are provided over the address and control bus 112 from the issue control and bypass control unit 102. Each port 115a and 115b may each provide a plurality of operands to each execution unit. It will be appreciated that operands may also be obtained from other sources (e.g. a data cache or a bus).

The issue control and bypass control 102 receives signals over interconnections 110a and 110b which indicate the status of the multifunctional execution units 103 and 104 respectively. In particular, the issue control and bypass control unit 102 determines whether each of the multifunctional execution units 103 and 104 is busy executing a prior instruction. This is typically performed during each processor cycle under control of a processor clock. If a particular unit is not busy, then the issue control and bypass control unit will issue the next in order program instruction to the multifunctional execution unit which is not busy over the interconnection 110a or 110b as appropriate. Using the program instruction provided by the issue control and bypass control 102, and using the operands provided through the particular multiplexer, the multifunctional execution unit will perform the operation required by the program instruction and will provide an output which is then provided to an input of both multiplexers 105 and 106 and also to the register file 107.

In this discussion, it is assumed that the processor executes program instructions in order rather than out of order. In order means that the program instructions are executed in the order of receipt which is typically determined by the order in which the compiler generates and stores executable program instructions. In an alternative embodiment according to the present invention, a microprocessor may implement out of order issuing of program instructions by utilizing reservation stations which are well known in the art.

Figure 3:
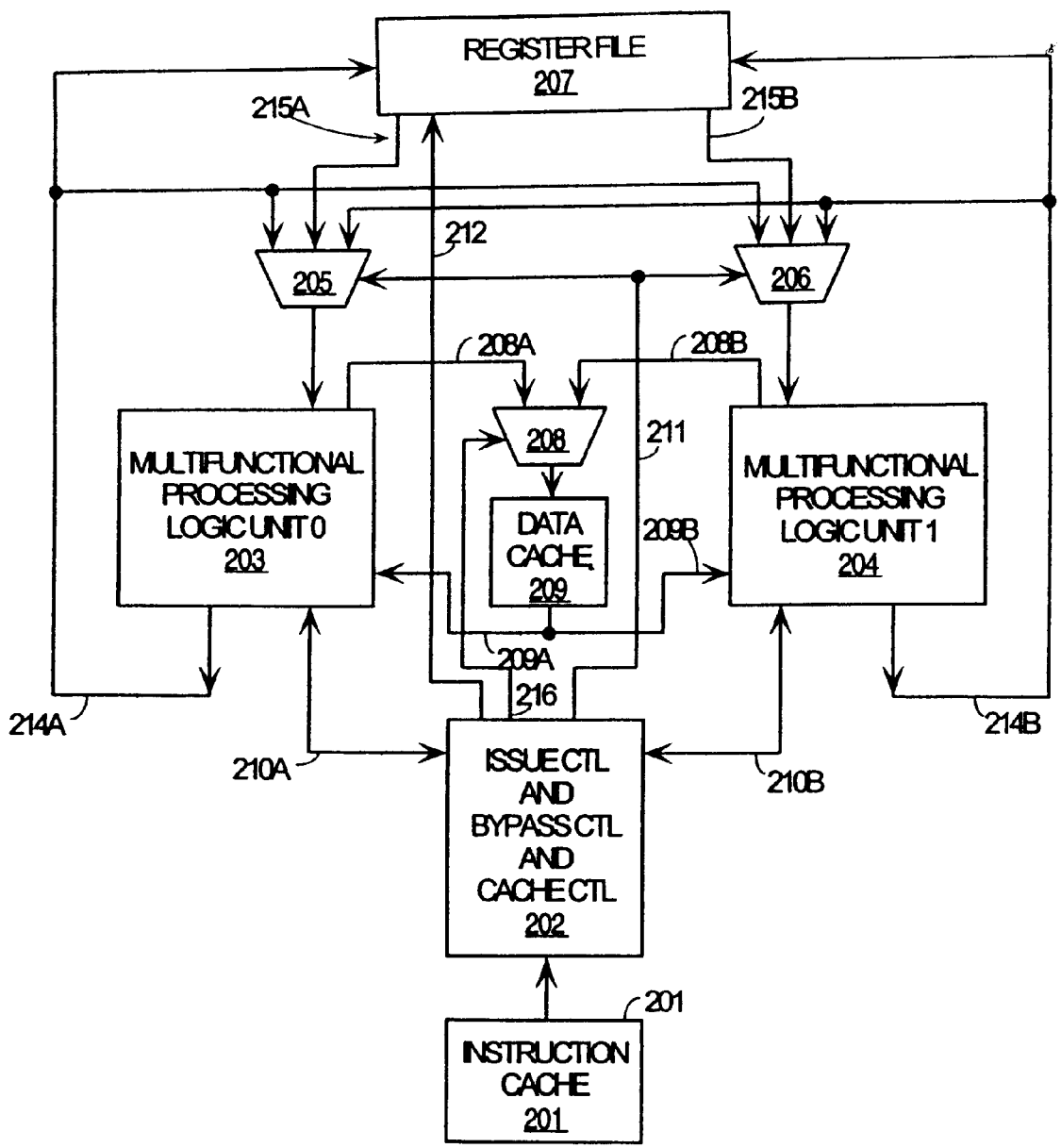
FIG. 3 represents another embodiment of a microprocessor according to the present invention.

FIG. 3 shows another embodiment of a microprocessor according to the present invention. This embodiment is similar to the microprocessor shown in FIG. 2 except that a data cache 209 is shared between the two multifunctional processing logic units 203 and 204. An issue control unit 202 controls the issue of program instructions as well as controlling the bypass operation and also controls the operation of the data cache 209. The issue control 202 receives instructions, usually two at a time, from the instruction cache 201. The issue control unit 202 is coupled to the two groups of multifunctional processing logic units 203 and 204 by the interconnects 210a and 210b respectively. These interconnects 210a and 210b provide instructions to the units 203 and 204 and receive status indicators from these units, such as a busy status. Input operands for units 203 and 204 are received from the outputs of multiplexers 205 and 206 respectively, and the results of the executed instructions are provided at the outputs 214a and 214b respectively of the multifunctional processing logic units 203 and 204. These outputs are routed back as inputs to each of the multiplexers 205 and 206 and also as inputs to the register file 207. Read ports 215a and 215b provide operand inputs from the register file 207 which are selected when bypassing is disabled. Address and control bus 212 from the issue control unit 202 provides address and control signals to the register file 207 to retrieve operands and to store execution results in the register file 207. Select line 211 controls the bypass or no bypass status of the multiplexers 205 and 206, and this status is controlled by the bypass control unit which is part of the issue control unit 202.

As with the example shown in FIG. 2, the microprocessor of FIG. 3 includes two symmetrical multifunctional processing logic units each of which provide the same set of processing operations or functions which are capable of performing various operations or functions as required by the various program instructions issued by the issue control unit 202. For example, if multifunctional processing logic unit 203 includes a floating point adder and a floating point divider and an ALU, then the multifunctional processing logic unit 204 will include logic which provides the same processing functions. Thus the issue control unit 202 will not need to decode program instructions in order to determine the function specified by the program instructions which are to be executed in either group of execution units.

It will be appreciated that the data cache 209 represents one example of a shared resource which may be used in a microprocessor in accordance with the present invention. Other types of shared resources will also be understood to be available to be used by those of ordinary skill in the art. Inputs, such as address and/or data inputs to the data cache are multiplexed by the multiplexer 208 which is controlled by the cache control 202 through the select line 216. The inputs 208a and 208b may be addresses and/or data. The output from data cache 209 is provided simultaneously over buses 209a and 209b to units 203 and 204 respectively. In the case of a read of data cache 209, an address is provided by the execution unit which is controlling the data cache 209 over either input bus 208a or 208b and this address causes the data cache 209 to retrieve data which is provided over both output buses 209a and 209b. The particular execution unit which is controlling the operation of the data cache 209 will receive and utilize the data retrieved from the data cache 209 and the other execution unit will merely ignore the data. When the issue control unit 202 receives two instructions which are to be issued, it determines whether a shared resource will be required by both instructions. If both instructions require the shared resource, then the issue control 202 will only issue the high priority instruction and will stall the low priority instruction. It will be appreciated that the high priority instruction in the case of an in order microprocessor is the first program instruction in the order of the executed program. The data cache 209 may be coupled to a data and address bus (and input/output buffers) in order to exchange data between the cache 209 and systems (e.g. system RAM) which are separate from the microprocessor.

Figure 4:
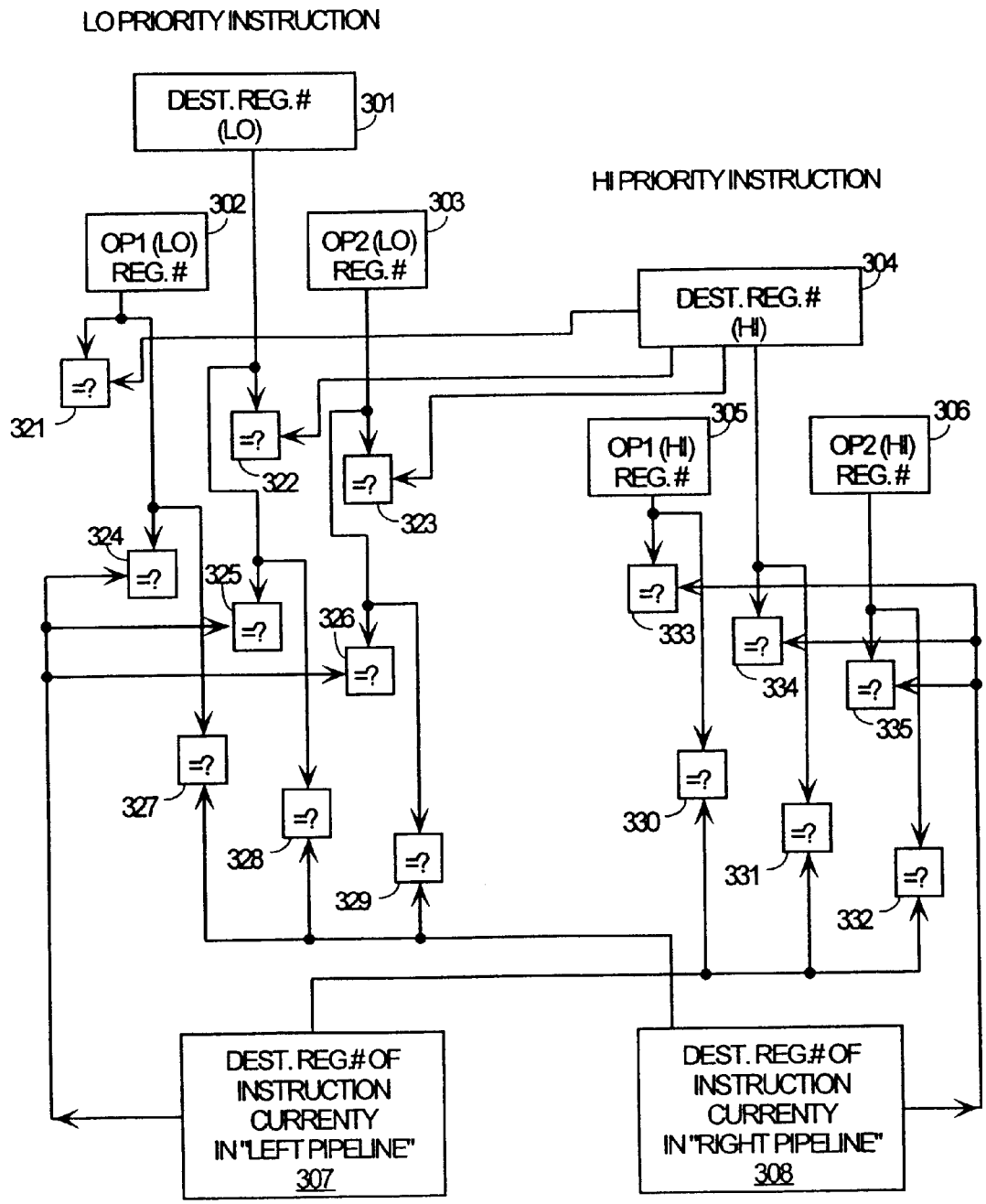
FIG. 4 illustrates register dependency comparisons performed in one implementation of a microprocessor according to the present invention.
Figure 5:
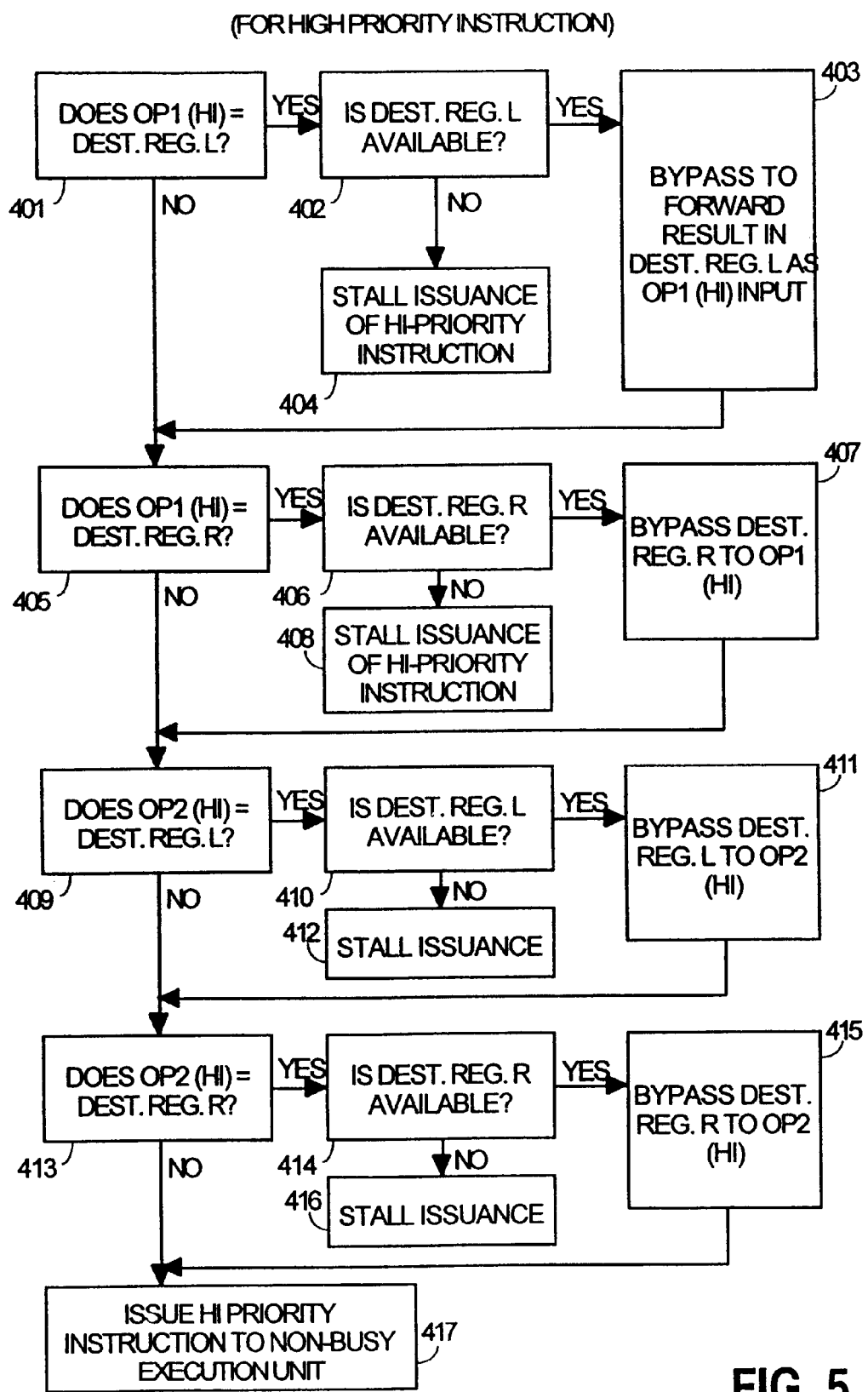
FIG. 5 shows a flowchart representing one method for performing stall and bypass logic processing for a high priority instruction according to one embodiment of the present invention.
Figure 6:
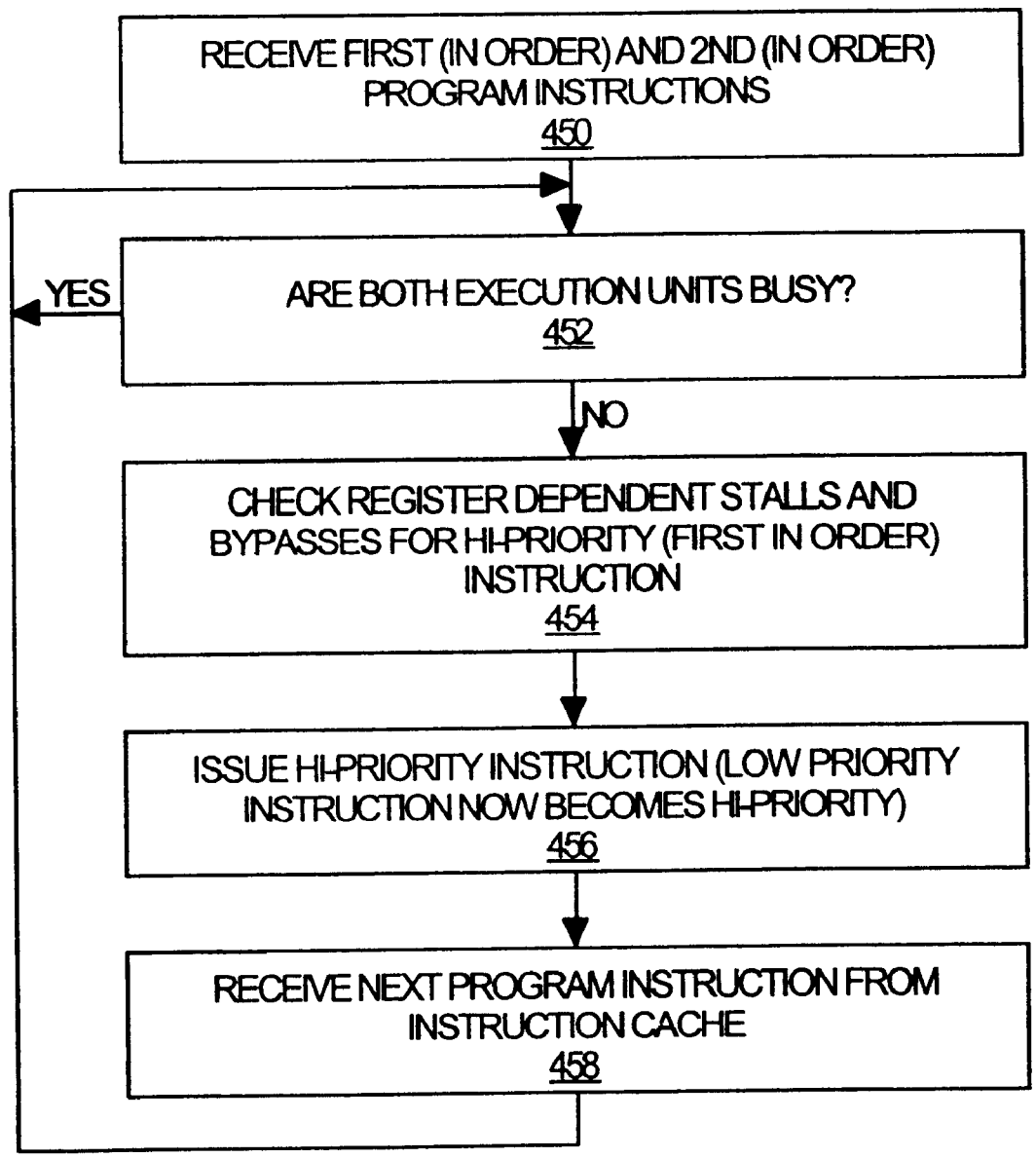
FIG. 6 shows a flowchart illustrating a method according to one embodiment of the present invention for determining whether to issue an instruction for execution.

FIGS. 4, 5, and 6 illustrate the various control operations which are performed by the issue control unit in one example of the present invention. In the following discussion, it will be assumed that the particular example of the issue control unit is the issue control and the bypass control unit 102 of the example shown in FIG. 2.

In the example shown in FIG. 4, there are fifteen comparisons which are performed to determine whether there are any matches between the addresses for various registers which are to be used for the low priority and the high priority instructions that are yet to be issued and the destination registers for instructions that are currently in the left and right groups of execution units. In particular, there are fifteen comparison operations 321–335, and the results of these comparison operations determine register dependency stalls and bypass operations. For example, the address or identification of the destination register 304 for the high priority instruction is compared in comparison 322 to the address or identification of the destination register 301 for the low priority instruction (yet to be issued). Similarly, the address or identification of the destination register 304 for the high priority instruction which is yet to be issued is compared against the address or identification of the first and second operands 302 and 303 for the low priority instruction yet to be issued in comparisons 321 and 323. The remainder of the comparisons shown in FIG. 4 determine whether the address or identification of either destination register for both instructions currently in both execution unit pipelines matches the address or identification for the registers 301–306 of both instructions which are yet to be issued.

FIG. 5 shows the control processing operations performed by an issue control unit of the present invention. This flowchart shows the control processes for the high priority instruction; it will be appreciated that a similar set of control processing operations is performed for the low priority instruction. The flowchart of FIG. 5 may be interpreted to show a sequence in time of these control processes; however, it will be appreciated that these control processes may be performed in parallel. For example, steps 401, 405, 409, and 413 may be performed in parallel such that the processes are performed substantially concurrently (at the same time). Other methods for performing the processes in parallel will be appreciated by those skilled in the art. In steps 401, 405, 409, and 413, the issue control logic determines whether the address for the register for either operand for the high priority instruction matches the address of the destination registers being used (or to be used) by the currently executed instructions in the left and right pipelines. It will be appreciated that the term "pipeline" refers to one group of execution units such that the microprocessor shown in FIG. 2 has two pipelines represented by the multifunctional units 103 and 104 respectively. Steps 401, 405, 409, and 413 represent the comparisons 330, 333, 332, and 335 respectively of FIG. 4. If all four of these comparisons reveal that there are no matches, then in step 417, the high priority instruction is issued to a non-busy group of execution units. If any one of the comparisons results in a match then further processing is performed to determine whether to stall the issuance of the high priority instruction or to bypass the result contained in a destination register for use as the operand input for the high priority instruction to be issued. These additional control processing steps are shown as steps 402–404, 406–408, 410–412, and 414–416. For example, if the comparison in step 401 indicates that there is a match between the first operand for the high priority instruction and the destination register for the left pipeline, then step 402 determines whether the data is available in that destination register (e.g. due to the fact that the execution of the prior instruction has been completed and the result of that execution has been stored in the destination register for the left pipeline). If this register is not available because it does not contain the result of the prior execution then in step 404 the issue control logic stalls the issuance of the high priority instruction. If the data is available then processing proceeds to step 403 in which the result from the prior executed instruction is used as the operand 1 input for the yet to be issued high priority instruction. This is typically implemented by causing the output from the left pipeline to be provided to the multiplexer which is used to route operand inputs to the particular group of execution units. After determining that a bypass is required in step 403, processing proceeds to step 405 (in the embodiment where steps 401 and 405 are not performed in parallel).

FIG. 6 shows one example of the control operations performed by the particular example of an issue control logic according to the present invention. The issue control logic normally receives the first and second program instructions which are kept in order; this is shown in step 450. Then in step 452, the issue control unit determines whether both groups of execution units are busy by monitoring the status lines from each group of execution units. It should be noted that the present invention may be used where there are more than two groups of execution units; for example, three groups of symmetrical multifunctional execution units may be used with the present invention. In step 454, the various register dependent stalls and bypasses are checked for the high priority instruction. These register dependent stalls and bypass checks may be similar to those described and shown in FIGS. 4 and 5. In step 456, if a group of execution units is not busy and if there are no stalls asserted for the high priority instruction, then the high priority instruction will issue to a group of execution units. Concurrently, this group of execution units will receive operands from its operand input port and will perform the instruction on the operands and provide an instruction result at the result output port of the group of execution units. Step 458 shows that the next program instruction is received from the instruction cache and the previously low priority instruction will now become the high priority instruction and processing recycles back to step 452. It will be appreciated that, as an alternative to steps 454 and 456 shown in FIG. 6, the issue control logic may concurrently check register dependent stalls and bypasses for both the high and low priority instructions and then issue concurrently both the high and low priority instructions and then receive the next two program instructions and then recycle back to step 452.

The present invention has been described in the context of several examples which have assumed certain specific architectures. It will be appreciated that the present invention may be employed in other architectures. For example, more than two groups of execution units each being symmetrical and multifunctional may be employed with the present invention. Moreover, the groups of execution units may share a shared resource such as a data cache. The present invention will allow simpler control logic to be used to control the issuance of instructions to the groups of execution units. There will be no need to decode program instructions for the purpose of determining the functions or processing required by each program instruction. Thus, instruction steering is eliminated as a requirement since each group of execution units provides identical functionality such that program instructions may be directed to any of the groups for execution. This design also simplifies other control operations as described above. While the foregoing invention has been described with respect to the above examples, it will be appreciated that the scope of the invention is limited only by the scope of the following claims.

What is claimed is:

1. An instruction issue control unit comprising logic to issue an instruction that is not decoded to a first multifunctional processing logic unit of a plurality of multifunctional processing logic units that each contain a set of independent processing logic circuits capable of performing a matching set of functions.

2. The instruction issue control unit of claim 1, wherein each of the plurality of multifunctional processing logic units contain at least two different independent processing logic circuits.

3. The instruction issue control unit of claim 1, wherein each of the plurality of multifunctional processing logic units contain a floating point processing logic circuit an ALU processing logic circuit.

4. The instruction issue control unit of claim 3, wherein each of the plurality of multifunctional processing logic units contain an integer processing logic circuit.

5. The instruction issue control unit of claim 1, wherein each of the plurality of multifunctional processing logic units contain an identical set of execution units providing an identical set of processing functions.

6. The instruction issue control unit of claim 1, wherein each of the plurality of multifunctional processing logic units contain a floating point adder execution unit, an ALU execution unit, and an integer multiplier execution unit.

7. The instruction issue control unit of claim 1, wherein each of the plurality of multifunctional processing logic units contain a floating point adder execution unit, a floating point divide execution unit, and an ALU execution unit.

8. The instruction issue control unit of claim 1, wherein the instruction issue control unit comprises logic to issue the instruction by determining that the first multifunctional execution unit is not busy.

9. The instruction issue control unit of claim 1, wherein the instruction issue control unit comprises logic to issue a second instruction to a second multifunctional processing logic unit of the plurality substantially concurrently with issuing the aforementioned instruction.

10. The instruction issue control unit of claim 1, wherein the instruction issue control unit comprises logic capable of issuing an instruction to a multifunctional processing logic unit without determining processing functions to be performed by the multifunctional processing logic unit in response to the issued instruction.

11. The instruction issue control unit of claim 1: (i) wherein the instruction issue control unit is coupled with a shared resource that is shared between the plurality of multifunctional processing logic units; (ii) wherein the instruction issue control unit comprises logic to determine that the shared resource is needed by both the instruction and a second instruction within the issue control unit; and (iii) wherein the instruction issue control unit comprises logic to stall the second instruction due to the determination that the shared resource is needed by the other instruction.

12. The instruction issue control unit of claim 11, wherein the shared resource comprises a data cache.

13. A microprocessor comprising:
a plurality of registers to store operands;
an instruction cache to store instructions;
an instruction issue control unit coupled with the instruction cache to receive instructions from the cache and to issue instructions;
a first multifunctional execution unit coupled with the instruction issue control unit and with the plurality of registers and containing a first plurality of different execution units that are capable of providing a first set of functions on operands received from the cache according to instructions received from the instruction issue control unit;
a first multiplexer coupled between the plurality of registers and the first multifunctional execution unit to receive a first operand from the registers and provide the first operand to the first multifunctional execution unit, wherein the first multiplexer has a single input to receive a result of an executed instruction that has been executed by the first multifunctional execution unit;
a second multifunctional execution unit coupled with the instruction issue control unit and with the plurality of registers and containing a second plurality of different execution units that are capable of providing a second set of functions on operands received from the cache according to instructions received from the instruction issue control unit, wherein the first set of functions and the second set of functions match; and
a second multiplexer coupled between the plurality of registers and the second multifunctional execution unit to receive a second operand from the registers and provide the second operand to the second multifunctional execution unit, wherein the second multiplexer has only one input to receive a result of an executed instruction that has been executed by the second multifunctional execution unit.

14. The microprocessor of claim 13, wherein the first multiplexer has a single input to receive the result of the executed instruction that has been executed by the second multifunctional execution unit.

15. The microprocessor of claim 14, further comprising a third multifunctional execution unit coupled with the instruction issue control unit and with the plurality of registers and containing a third plurality of different execution units that are capable of providing a third set of functions on operands received from the cache according to instructions received from the instruction issue control unit, wherein the third set of functions is identical to the second set of functions.

16. A microprocessor comprising:
a plurality of registers to store at least one operand;
an instruction cache to store at least one un-decoded instruction;
an instruction issue control unit coupled with the instruction cache to receive the instruction and comprising logic to issue the un-decoded instruction; and
a plurality of multifunctional processing pipelines that are each coupled with the plurality of registers to receive the operand, that are each coupled with the instruction issue control unit to receive the issued instruction, and that each comprise a set of independent processing logic circuits that are capable of providing a matching set of processing functions, wherein each set of independent processing logic circuits contains at least two different independent processing logic circuits including an independent processing logic circuit that is capable of processing the operand according to the issued instruction.

17. The microprocessor of claim 16, wherein each of the plurality of multifunctional processing pipelines contain an identical set of execution units that provide an identical set of processing functions.

18. The microprocessor of claim 16, wherein the logic of the instruction issue control unit is capable of issuing an instruction to a multifunctional processing pipeline without determining processing functions to be performed by the pipeline in response to the instruction.

19. The microprocessor of claim 16, further comprising a shared resource that is coupled with and shared between the plurality of multifunctional processing pipelines.

20. The microprocessor of claim 16, wherein the instruction issue control unit is coupled with the shared resource and comprises logic to determine that the shared resource is needed by the instruction and a second instruction received from the instruction cache and to stall the second instruction due to this determination.

21. The microprocessor of claim 16, wherein the shared resource comprises a data cache.

22. The microprocessor of claim 16, wherein each of the plurality of multifunctional processing pipelines contain at least two different independent processing logic circuits.

23. The microprocessor of claim 16, wherein each of the plurality of multifunctional processing pipelines contain a floating point processing logic circuit an ALU processing logic circuit.

24. The microprocessor of claim 23, wherein each of the plurality of multifunctional processing pipelines contain an integer processing logic circuit.

25. The microprocessor of claim 16, wherein each of the plurality of multifunctional processing pipelines contain a floating point adder execution unit, an ALU execution unit, and an integer multiplier execution unit.

26. The microprocessor of claim 16, wherein each of the plurality of multifunctional processing pipelines contain a floating point adder execution unit, a floating point divide execution unit, and an ALU execution unit.

27. The microprocessor of claim 16, wherein the instruction issue control unit comprises logic capable of issuing an instruction to a multifunctional processing pipeline without determining processing functions to be performed by the multifunctional processing pipeline in response to the issued instruction.

28. An integrated circuit comprising:
a plurality of registers to store at least one operand;
an instruction cache to store at least one un-decoded instruction;
instruction issue means coupled with the instruction cache for issuing the un-decoded instruction received from the instruction cache; and
a plurality of multifunctional processing pipelines that are each coupled with the plurality of registers to receive the operand, that are each coupled with the instruction issue means to receive the issued un-decoded instruction, and that each comprise a set of independent processing logic circuits that are capable of providing a matching set of processing functions, wherein each set of independent processing logic circuits contains at least two different independent processing logic circuits including an independent processing logic circuit that is capable of processing the operand according to the issued instruction.

29. The integrated circuit of claim 28, implemented as a microprocessor.

30. The microprocessor of claim 13, wherein the instruction issue control unit comprises logic to substantially concurrently issue both a first instruction to the first multifunctional execution unit and a second instruction to the second multifunctional execution unit.

31. The microprocessor of claim 13, wherein the instruction issue control unit comprises logic to issue an instruction to the first multifunctional execution unit by determining that the first multifunctional execution unit is not busy executing a previously issued instruction.

32. The microprocessor of claim 13, wherein the instruction issue control unit comprises logic to issue instructions that are not decoded.

33. The microprocessor of claim 13, wherein the first and the second multifunctional execution units are symmetrical.

34. The microprocessor of claim 13, wherein both the first multifunctional execution unit and the second multifunctional execution unit comprise a floating point execution unit and an ALU execution unit.

35. The microprocessor of claim 34, wherein both the first and the second multifunctional execution units comprise an integer execution unit.

36. The microprocessor of claim 13, wherein both the first and the second multifunctional execution units comprise an identical set of three different execution units.

37. The microprocessor of claim 13, further comprising a data cache coupled with the first and the second multifunctional execution units and the instruction issue control unit.

* * * * *